US012564886B2

(12) United States Patent
Milesi et al.

(10) Patent No.: US 12,564,886 B2
(45) Date of Patent: Mar. 3, 2026

(54) MACHINE TOOL, IN PARTICULAR LATHE WITH AUXILIARY SPINDLE

(71) Applicants: GILDEMEISTER Italiana S.r.l., Brembate di Sopra (IT); DMG MORI CO., LTD., Yamatokoriyama (JP)

(72) Inventors: Luca Milesi, San Giovanni Bianco (IT); Stefano Corti, Calusco d'Adda (IT); Mirko Passerini, Gaggiano (IT); Takero Kan, Nara (JP); Tatsuhiko Kuriya, Nara (JP); Hironori Miura, Nara (JP); Kosuke Komorita, Nara (JP)

(73) Assignees: GILDEMEISTER ITALIANA S.R.L., Brembate di Sopra (IT); DMG MORI CO., LTD., Yamatokoriyama (JP)

( * ) Notice: Subject to any disclaimer, the term of this patent is extended or adjusted under 35 U.S.C. 154(b) by 641 days.

(21) Appl. No.: 17/802,508

(22) PCT Filed: Feb. 9, 2021

(86) PCT No.: PCT/EP2021/053082
§ 371 (c)(1),
(2) Date: Aug. 25, 2022

(87) PCT Pub. No.: WO2021/170395
PCT Pub. Date: Sep. 2, 2021

(65) Prior Publication Data
US 2023/0078509 A1 Mar. 16, 2023

(30) Foreign Application Priority Data
Feb. 28, 2020 (EP) .................................... 20160262

(51) Int. Cl.
*B23B 3/16* (2006.01)
*B23B 1/00* (2006.01)
(Continued)

(52) U.S. Cl.
CPC .................. *B23B 3/16* (2013.01); *B23B 1/00* (2013.01); *B23B 3/30* (2013.01); *B23Q 39/021* (2013.01)

(58) Field of Classification Search
CPC ........ B23Q 2039/008; B23Q 2240/007; B23Q 39/021; B23B 3/16; B23B 3/168; B23B 3/30
See application file for complete search history.

(56) References Cited

U.S. PATENT DOCUMENTS

| | | | | |
|---|---|---|---|---|
| 4,177,701 | A | * | 12/1979 | Schulz ..................... B23Q 1/76 82/104 |
| 4,631,995 | A | * | 12/1986 | Vroenen ............... B23B 31/101 82/164 |

(Continued)

FOREIGN PATENT DOCUMENTS

| | | |
|---|---|---|
| CN | 110871275 A | 3/2020 |
| DE | 3609571 A1 | 9/1987 |

(Continued)

OTHER PUBLICATIONS

Office Action received in CN 202180010542.5, dated Jun. 26, 2024, in 15 pages (with translation).

(Continued)

*Primary Examiner* — Sara Addisu
(74) *Attorney, Agent, or Firm* — Procopio, Cory, Hargreaves & Savitch LLP

(57) ABSTRACT

Machine tool such as a lathe has a machine frame 110 having an upper tool carrier support portion 113, a lower tool carrier support portion 114 and a spindle carrier portion arranged between the upper and lower tool carrier support portions. A spindle carrier, is arranged on or at a height of the spindle carrier portion of the machine frame 110, supporting a main spindle 121 configured to receive a workpiece, and a plurality of tool carriers, each tool carrier being supported on a (Continued)

tool carrier assembly 150 being arranged on either the upper tool carrier support portion 113 or the lower tool carrier support portion 114 of the machine frame 110, wherein the machine tool also includes an auxiliary spindle carrier 130 arranged on the spindle carrier portion of the machine frame 110, for supporting an auxiliary spindle 131 configured to receive and guide a workpiece for parallel machining.

12 Claims, 12 Drawing Sheets

(51) Int. Cl.
　　*B23B 3/30*　　　　(2006.01)
　　*B23Q 39/02*　　　(2006.01)

(56)　　　　　References Cited

U.S. PATENT DOCUMENTS

| | | | | |
|---|---|---|---|---|
| 4,838,135 | A * | 6/1989 | Hevoyan | B23Q 7/04 |
| | | | | 82/162 |
| 5,014,580 | A * | 5/1991 | Porter | B25B 5/147 |
| | | | | 82/162 |
| 5,078,556 | A * | 1/1992 | Schrod | B23C 3/06 |
| | | | | 409/269 |
| 5,127,140 | A * | 7/1992 | Oiwa | B23Q 39/048 |
| | | | | 700/169 |
| 5,222,421 | A * | 6/1993 | Ushiro | B23Q 3/16 |
| | | | | 82/903 |
| 6,128,812 | A * | 10/2000 | Link | B23B 29/242 |
| | | | | 82/159 |
| 9,162,290 | B2 * | 10/2015 | Ellicott | B23B 23/02 |
| 9,623,526 | B2 * | 4/2017 | Perez | B23B 25/00 |
| 2008/0178719 | A1 * | 7/2008 | Tanaka | B23Q 1/76 |
| | | | | 82/162 |
| 2010/0251863 | A1 * | 10/2010 | Sakai | B23B 3/168 |
| | | | | 82/170 |
| 2020/0070252 | A1 * | 3/2020 | Passerini | B23B 3/30 |
| 2021/0008630 | A1 * | 1/2021 | Kobayashi | B23Q 1/4852 |
| 2022/0161333 | A1 * | 5/2022 | Inoue | B23Q 17/12 |
| 2022/0234112 | A1 * | 7/2022 | Suzuki | B23B 13/04 |
| 2023/0266744 | A1 * | 8/2023 | Kakumoto | B23Q 15/12 |
| | | | | 700/28 |
| 2024/0307972 | A1 * | 9/2024 | Passerini | B23B 13/04 |
| 2024/0367210 | A1 * | 11/2024 | Passerini | B21D 7/04 |

FOREIGN PATENT DOCUMENTS

| | | | |
|---|---|---|---|
| DE | 102010007890 | A1 | 8/2011 |
| DE | 102015220882 | A1 | 10/2015 |
| JP | S61-166709 | U | 10/1986 |
| JP | H0463648 | A | 2/1992 |
| JP | H11-000801 | A | 1/1999 |
| WO | 2008/013313 | A1 | 1/2008 |

OTHER PUBLICATIONS

The State Intellectual Property Office of China, First Notice of Review Observations, Application No. 202180010542.5, dated Dec. 18, 2023, in 40 pages.

Decision of Rejection received in CN 202180010542.5, dated Oct. 14, 2024, in 29 pages (with translation).

Office Action received in EP 20160262.0, dated Feb. 6, 2024, 6 pages.

Office Action received in JP2022-550782, dated Dec. 23, 2024, in 26 pages (with translation).

European Patent Office, Extended European Search Report, Application No. 20160262.0, dated Sep. 10, 2020, In 8 pages.

Notification of Reasons for Refusal received in JP2022-550782, dated Jun. 23, 2025, in 6 pages (with translation).

\* cited by examiner

MS= Main Spindle; CS=Counter Spindle;
AS=Additional Spindle

MACHINE TOOL, IN PARTICULAR LATHE WITH AUXILIARY SPINDLE

CROSS-REFERENCE TO RELATED APPLICATIONS

This application is US National Stage of International Patent Application PCT/EP2021/053082, filed Feb. 9, 2021, which claims benefit of priority from European Patent Application EP20160262.0, filed Feb. 28, 2020, the contents of both of which are incorporated herein by reference.

The present application relates to a machine tool, in particular a lathe or turret lathe having an auxiliary or additional spindle arrangement.

Machine tools of a generic type, such as for example a lathe or turret lathe, typically comprise a machine frame that may be provided with at least two rotatably mounted work spindles which face each other and have parallel or coaxial spindle axes, wherein the work spindles can receive workpieces which are machined on the machine tool.

For example EP 2 714 307 B1 relates to a machine tool, in particular to a lathe, comprising a machine frame, a first work spindle which is arranged on a spindle carrier face of the machine frame and is to receive a first workpiece, a second work spindle which faces the first work spindle, is arranged on a spindle carrier face of the machine frame and is to receive a second workpiece, the axis of the second work spindle being aligned parallel, in particular coaxially to the axis of the first work spindle, and comprising two movable tool carrier slides, on which a respective tool-carrying tool carrier is arranged.

In general, machine tools of this type require that the machine tool be provided so as to enable efficient machining of the workpieces with the largest possible number of tools usable at the same time, if possible, with the highest possible degree of flexibility as regards the control of the relative movements between the tools and the tools received in the work spindles, accompanied by a simultaneous compact and cost-effective but rigid design of the machine tool, and with a machining area which can be accessed in the best possible way by the processor or operator of the machine tool.

It is an object of the invention to improve a machine tool of the generic type so as to overcome the drawback of the conventional machine tools and to enable more efficient machining of the workpieces. Specifically it is an object to increase the degree of flexibility for machining the workpieces while reducing the machining costs.

To solve the problems the features of the independent claims are suggested. Preferred developments are in the dependent claims.

A machine tool according to an exemplary embodiment may be a lathe, comprising a machine frame having an upper tool carrier support portion, a lower tool carrier support portion and a spindle carrier portion arranged between the upper and lower tool carrier support portions. A spindle carrier may be arranged on or at a height of the spindle carrier portion of the machine frame, supporting a main spindle configured to receive a workpiece, the main spindle having a horizontally arranged main spindle axis. A plurality of tool carriers may be provided, each tool carrier being supported on a tool carrier assembly being arranged on either the upper tool carrier support portion or the lower tool carrier support portion of the machine frame. The machine tool may include an auxiliary spindle carrier arranged on the spindle carrier portion of the machine frame, supporting an auxiliary spindle configured to receive and guide a workpiece. Based on this specific configuration, having the upper and lower tool carrier supports in combination with a preferably centrally arranged auxiliary spindle between a main spindle and an auxiliary spindle a highly efficient machining system can be provided which at the same time allows to reduce production costs.

The auxiliary spindle carrier may be configured to move the auxiliary spindle along the main spindle axis. Moreover, the auxiliary spindle may include at least one direct drive arranged around a guide clamp unit of the auxiliary spindle. Accordingly, flexible and efficient machining of the workpiece clamped in the auxiliary spindle can be achieved. Specifically, the processing distance of the tool carrier assembly on the tool carrier support slide can be reduced to a minimum since the auxiliary spindle carrier can be moved closely to the tool carrier assembly.

The auxiliary spindle may be further configured to clamp the workpiece such that two opposing ends of the workpiece can be exposed from the auxiliary spindle for machining operations. The machine tool may be configured to parallel machine at least two workpieces, one workpiece clamped in the main spindle and one workpiece clamped into the auxiliary spindle. Accordingly, flexible and efficient machining of the workpiece clamped in the auxiliary spindle can be achieved. The processing distance of the tool carrier assembly on the tool carrier support slide can be reduced to a minimum since the auxiliary spindle carrier can be rotated and/or moved closely to the tool carrier assembly.

The auxiliary spindle may be configured to be rotated around an axis extending perpendicular to the main spindle axis for more flexible machining. At the same time the movement distance of the work tools can be reduced. The auxiliary spindle may be configured to be movable in a plane which includes the main spindle axis and a vertical axis orthogonal to the main spindle axis wherein the auxiliary spindle may be further configured to be rotatable around an axis extending perpendicular to said plane.

The auxiliary spindle may include a sleeve which can be electrically, hydraulically and/or pneumatically controlled to fixedly clamp the workpiece coaxially with the auxiliary spindle axis.

The auxiliary spindle carrier may be configured to move in a vertical direction, orthogonal to the main spindle axis such as to move the auxiliary spindle axis of the auxiliary spindle parallel to the main spindle axis.

The machine tool may include a counter-spindle carrier being arranged on the spindle carrier portion of the machine frame, supporting a counter spindle facing the main spindle and being configured to receive a workpiece, the counter spindle having a horizontally arranged spindle axis being arranged coaxially with the main spindle axis.

The machine tool may further include at least an upper tool carrier assembly mounted on the upper tool carrier support portion and at least a lower tool carrier assembly mounted on the lower tool carrier support portion, wherein the tool assemblies are configured to independently machine one or more workpieces accommodated in the auxiliary spindle.

The auxiliary spindle may have two opposing sides spaced apart along the auxiliary spindle axis wherein each side is configured to receive a workpiece so that the auxiliary spindle can receive two separate workpieces at the same time. Each side may have a separate and independent clamping unit for clamping a workpiece. Moreover, the sides of the auxiliary spindle may also be end surfaces of the auxiliary spindle. The auxiliary spindle may have a first side that is the left end side and a second side that is the right end side which is opposite the first side.

The auxiliary spindle may include chucks having jaws that move independently, to hold irregularly shaped workpieces and preferably the auxiliary spindle includes two separate chucks spaced apart along the auxiliary spindle axis and/or the auxiliary spindle includes a double cone collet for clamping the workpieces.

The auxiliary spindle may be mounted to a tool carrier of the upper tool carrier support portion or the lower tool carrier support portion of the machine frame.

The machine tool may further include two or more upper tool carrier assemblies mounted on the upper tool carrier support portion (and being movable independently) and two or more lower tool carrier assemblies mounted on the lower tool carrier support portion (and being movable independently) wherein each tool carrier assembly includes a tool carrier and the tool carriers are configured to independently machine workpieces accommodated in the auxiliary spindle and/or the main spindle and preferably the tool carriers machine the workpiece synchronously.

The auxiliary spindle may be configured as a turret unit having a turret disk configured to be rotatable, by a first driving means, around a disk axis which is an axis of rotation of the turret disk, and a second driving means for pivoting the turret head around a turret axis and wherein preferably the second driving means is a motor having a rotor arranged radially outside of the stator.

A turret disk of the turret unit may be configured to be rotatable, by a first driving means, around a disk axis which is an axis of rotation of the turret disk. The turret unit may include a second driving means for pivoting the turret head around a turret axis, and the second driving means may be a motor having a rotor arranged radially outside of the stator wherein the second driving means is integrated in the turret main body. The turret head may be mounted directly to the rotor of the second driving means.

The second driving means may be configured to directly drive the turret head for pivoting the turret head around the turret axis. The second driving means may be integrated in the turret main body such that a cylindrical inner part of the turret main body forms the stator of the second driving means and a cylindrical outer part of the turret main body forms the rotor of the second driving means. The turret disk may be arranged such that the disk axis intersects with rotor magnets of the second driving means, preferably perpendicular. Accordingly Flexible and efficient machining of the workpiece clamped in the auxiliary spindle can be achieved. The processing distance of the tool carrier assembly on the tool carrier support slide can be reduced to a minimum since the auxiliary spindle carrier can be rotated and/or moved closely to the tool carrier assembly.

A machining method for machining a workpiece using a machine tool may comprise the steps of providing a workpiece to the auxiliary spindle and clamping the workpiece in the auxiliary spindle and machining the clamped workpiece from at least one side.

The method may further comprise the step of receiving the workpiece from the main spindle and moving the clamped workpiece along the main spindle axis to or away from the main spindle.

The machining method may be a bar machining method and the workpiece to be processed may be loaded through the rear into the main spindle and from the main spindle to the auxiliary spindle and preferably from the auxiliary spindle to the counter spindle.

The machining method may be a chuck machining method and the workpiece to be processed may be clamped in the auxiliary spindle and machined parallel on two opposing sides.

The machining method may be configured to simultaneously machine two or more workpieces, at least one workpiece accommodated in the auxiliary spindle and one workpiece preferably accommodated in the main spindle.

The disclosure of EP application with the application number EP 18191544.8 (EP 3616832) is herewith incorporated by reference.

Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

DETAILED DESCRIPTION OF THE DRAWINGS AND DESCRIPTION OF EXEMPLARY EMBODIMENTS

Figure 1:
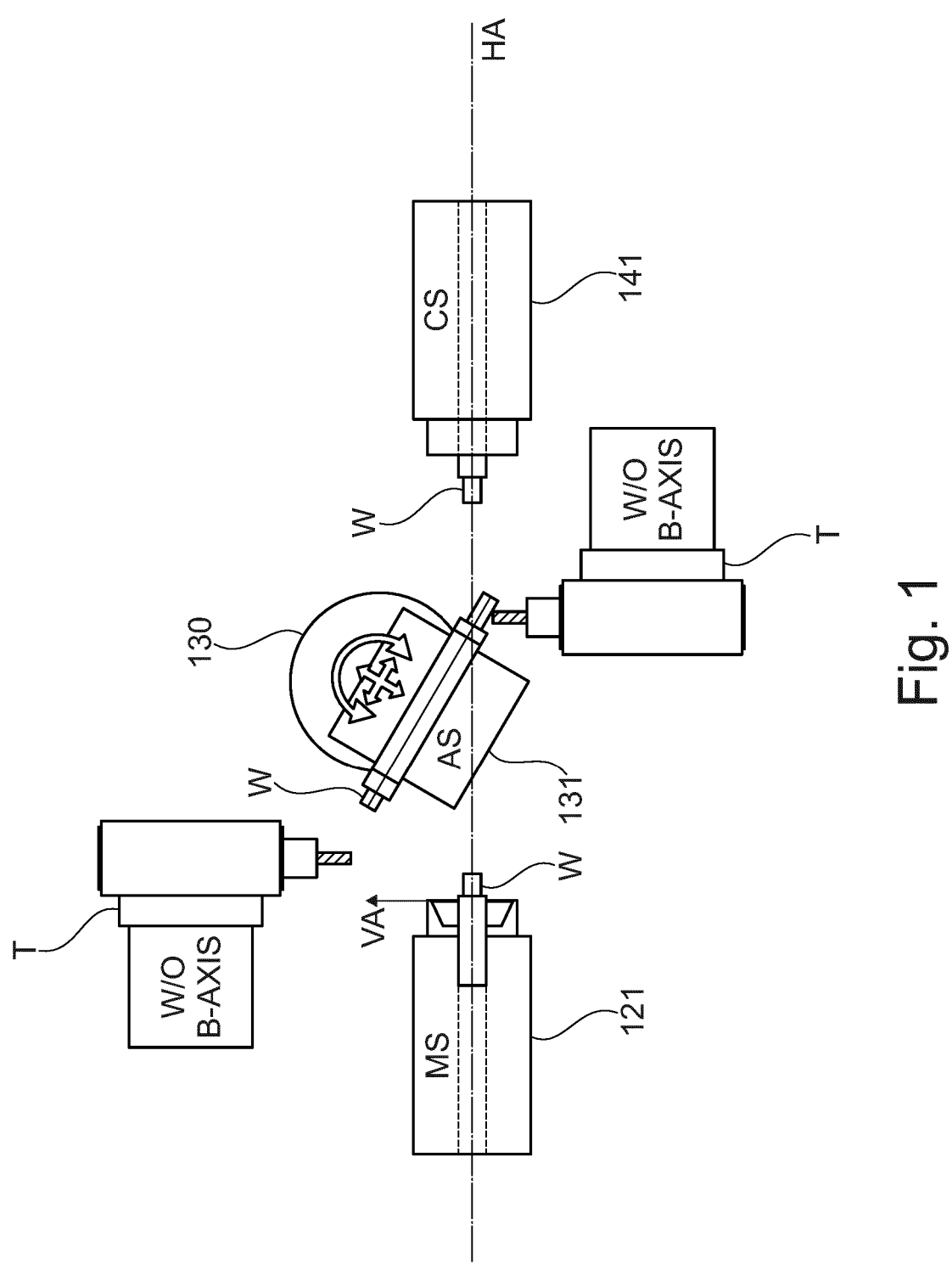
FIG. 1 exemplarily illustrates a schematic structure of a multi-spindle lathe having an auxiliary spindle arranged in the center.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1 shows an exemplary configuration according to the present invention. Specifically, the auxiliary spindle carrier 130 is provided having the auxiliary spindle 131 which is arranged between the main spindle 121 and the counter spindle 141. The main spindle 121 has the horizontal axis HA. Moreover, the vertical axis (of the main spindle) is designated as VA. In the embodiment shown in FIG. 1, separate workpieces W are clamped in the respective main spindle, auxiliary spindle and the counter spindle for synchronous machining.

Specifically, in the main spindle 121 the workpiece W is clamped. Said workpiece can be machined by tools provided on the tool carriers. In FIG. 1, for example, two turret units T are provided which are mounted onto the respective tool carrier support slides 151 such that said carrier support slides can be moved parallel to the horizontal axis HA. However, it is clear that the two tool carrier assemblies and specifically the turret unit T vertically above the horizontal axis HA and vertically below the horizontal axis HA are only exemplary and in a further development four tool carrier assemblies can be used for even further increasing the machining flexibility of the machine tool. Adjacent to the main spindle 121 having the workpiece W, the auxiliary spindle 131 is provided. Said auxiliary spindle 131 has a workpiece W clamped into the respective workpiece clamp unit. The auxiliary spindle 131 has a very specific arrangement according to the embodiment shown in FIG. 1 and specifically, said auxiliary spindle 131, attached to the auxiliary spindle carrier 130, is configured to be movable along the vertical and horizontal axis VA and HA.

Moreover, flexibility can be even further improved by allowing a rotary movement or pivoting movement of the auxiliary spindle 131 along an axis vertical to the plane established by the horizontal axis HA and the vertical axis VA. Please also refer to the rotary arrow shown in FIG. 1, indicating the rotary movement of the auxiliary spindle 131. Said rotary movement allows the auxiliary spindle 131 to rotate the clamped workpiece W and therefore rotate the auxiliary spindle axis XA in order to apply an angle between the auxiliary spindle axis XA and the horizontal axis HA. Flexible and efficient machining of the workpiece clamped in the auxiliary spindle 131 can therefore be achieved. Specifically, the processing distance of the tool carrier assembly on the tool carrier support slide 151 can be reduced to a minimum since the auxiliary spindle carrier 130 with the workpiece W can be moved closely to the tool carrier assembly.

As indicated, the tool assembly 150 may, for example, include the turret unit T as shown in FIG. 1, but is not limited to such a configuration. However, by providing a turret unit T having a turret disk with a plurality of slots for mounting tools, the processing flexibility of the machine tool, specifically lathe, can be maximized.

Moreover, movement and rotation of the auxiliary spindle 131 and the auxiliary spindle carrier 130 can be independent of the movement of the main spindle 121, the counter spindle 141 and the tool carrier support slides 151 with the respective tool carrier assemblies 150. A particularly beneficial embodiment includes the main spindle 121 capable of providing the workpieces through bar feeding along the central axis of the main spindle, i.e. the horizontal axis HA. The provided workpiece can be machined on the front end side by one or two tools of respective tool carrier assemblies attached to the tool carrier support slides 151 or by the respective tools of the turret units T vertically above or below the horizontal axis HA. In the next step, the workpiece, after machining the front end of the workpiece, can be clamped into the auxiliary spindle 131 by moving the auxiliary spindle carrier 130 together with the auxiliary spindle 131 to the main spindle and inserting the workpiece into the auxiliary spindle 131.

During the process of receiving the workpiece by auxiliary spindle 131 from the main spindle 121, the horizontal axis HA is coaxial to the auxiliary spindle axis XA so as to allow smooth insertion of the workpiece W. After the workpiece is inserted into the auxiliary spindle 131, the rear end of the workpiece can be cut free from the raw material of the workpiece included in the main spindle 121. Afterwards, the auxiliary spindle 131 having the workpiece W clamped along the auxiliary spindle axis XA can be moved away from the main spindle 121 such as to further process the front end and/or the rear end of the workpiece W clamped in the auxiliary spindle 131.

As shown exemplarily in FIG. 1, the front end of the workpiece W clamped in the auxiliary spindle 131 is machined by the turret unit T provided on the lower side of the horizontal axis HA and therefore in a vertical direction below the horizontal axis. At the same time, it would be possible to machine the rear end of the workpiece W clamped in the auxiliary spindle 131 by the turret unit T provided on the upper side of the horizontal axis HA and therefore the turret unit T vertically above the main spindle in FIG. 1. Accordingly, with such a configuration both ends of the workpiece in the auxiliary spindle 131 can be processed at the same time. The advantage is that the workpiece can be clamped only once and the error, due to clamping more than once, will be reduced. So, machining both side of workpiece will be possible. Higher flexibility can be achieved by providing the turret units with integrated drive units to drive the tools attached or received in the tool mounting positions of the turret unit T. For example, in FIG. 1, the respective turret units have as tools drills or milling cutters for processing the workpiece W.

Moreover, at the same time of processing the workpiece in the auxiliary spindle 131, also processing of the front end of a new workpiece W provided in the main spindle 121 is possible. As shown in FIG. 1, for example, the lower turret unit is machining the workpiece in the auxiliary spindle 131 wherein the turret unit T vertically above the main spindle can be moved towards the workpiece in the main spindle 121 for machining the front end of the respective workpiece. The specific flexibility provided by the special structure of the present embodiment allows a cost efficient and improved series production of workpieces.

In addition to the workpieces in the main spindle 121 and the auxiliary spindle 131, a workpiece may then be further included in the counter spindle 141 as also shown in FIG. 1. In the counter spindle the rear end of the workpiece can then be processed while at the same time also the workpiece in the main spindle 121 or the auxiliary spindle 131 may be machined. Accordingly, also very complex workpieces can be machined in an industrial series production process by using the machine tool of the present embodiment. Moreover, a maximum of flexibility and cost efficient production can be achieved by providing the turret units T with an additional B axis movement. Such a B axis movement may allow a turret head to be moved around the longitudinal axis of the turret main body as shown in e.g. FIG. 12.

Figure 2:
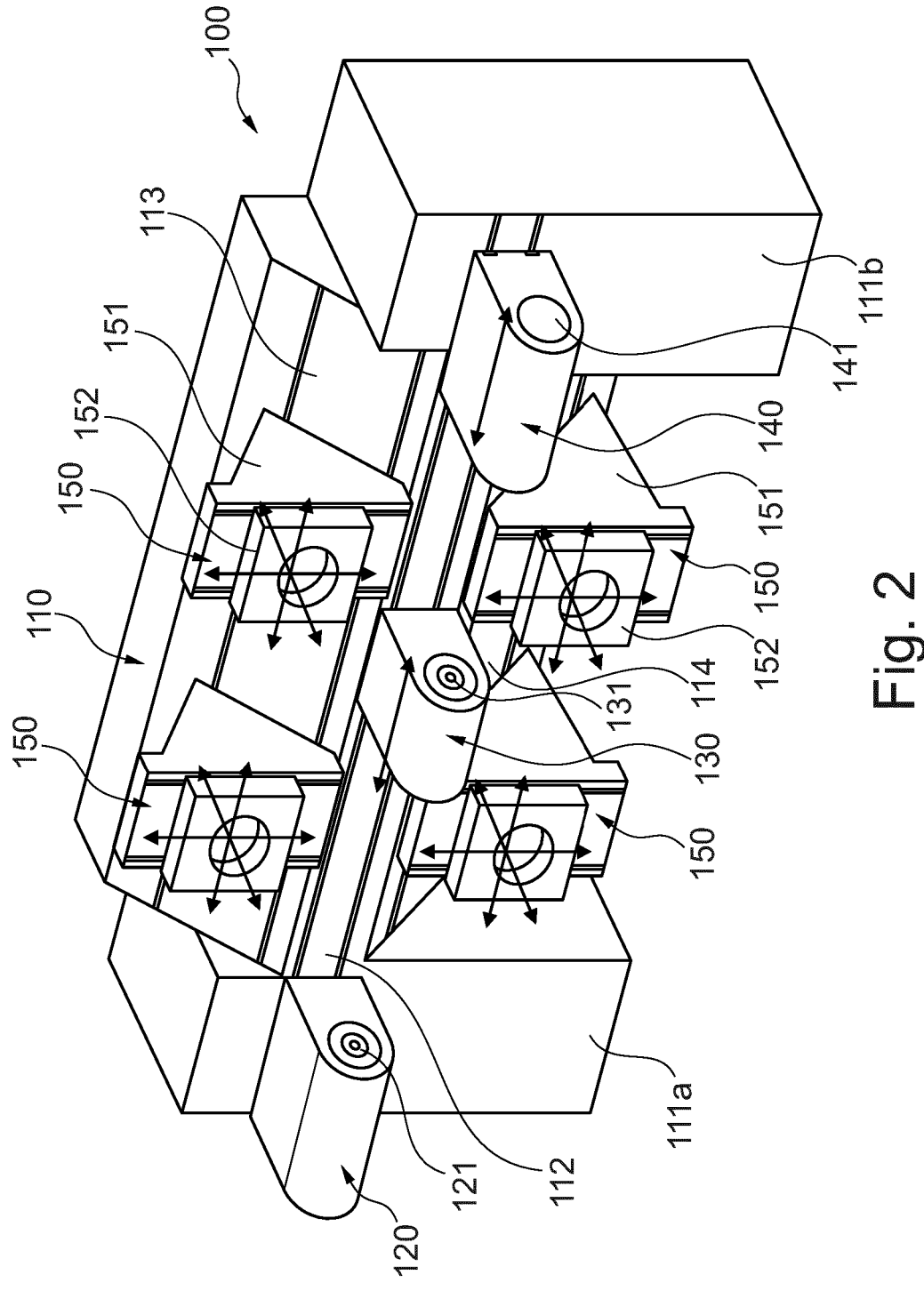
FIG. 2 exemplary illustrates a schematic perspective view of the multi-spindle lathe FIG. 3 exemplary illustrates another schematic perspective view of the multi-spindle lathe including turret units FIG. 4 exemplary illustrates an overview of the tool carrier assembly.

FIG. 2 exemplarily shows a schematic perspective view of a machine frame 110 of a machine tool according to FIG. 1. The machine frame 110 exemplarily stands on two machine stand portions 111a and 111b, and a carrier support portion of the machine frame 110 is exemplarily formed in between and held by the machine stand portions 111a and 111b.

The machine frame 110 exemplarily has an upper support portion 113 and a lower support portion 114, both of which exemplarily horizontally extend between the two machine stand portions 111*a* and 111*b*. A front support portion 112 of the machine frame 110 is formed between the upper support portion 113 and the lower support portion 114, wherein the front support portion 112 extends horizontally extend between the two machine stand portions 111*a* and 111*b*.

The front support portion 112 of the machine frame 110 exemplarily has a vertically arranged front surface. The upper side surface of the upper support portion 113 of the machine frame 110 is arranged at an inclined slope, exemplarily at an inclination angle of substantially 45 degrees (e.g. with respect to the work floor on which the machine frame 110 stands with its machine stand portions 111*a* and 111*b*). The lower side surface of the lower support portion 114 of the machine frame 110 is arranged at an overhanging inclined slope, exemplarily at an inclination angle of substantially 315 degrees (e.g. with respect to the work floor on which the machine frame 110 stands with its machine stand portions 111*a* and 111*b*).

In other exemplary embodiments, the inclination angle of the upper side surface of the upper support portion 113 of the machine frame 110 may be in the range of 30 to 60 degrees. Also, the inclination angle of the lower side surface of the lower support portion 114 of the machine frame 110 may be in the range of 300 to 330 degrees. Specifically, it may be preferably provided that the angle formed between the upper and lower support portions 113 and 114 is substantially 90 degrees.

For slidably supporting tool carrier assemblies 150 on the upper side of the machine frame 110 in a machining area between the spindles, the upper support portion 113 of the machine frame 110 has horizontally extending guides 113*a*. For slidably supporting tool carrier assemblies 150 on the lower side of the machine frame 110 in a machining area between the spindles, the lower support portion 114 of the machine frame 110 has horizontally extending guides 114*a*. For slidably supporting the counter spindle carrier 140 and the auxiliary spindle carrier 130, the front-side oriented front support portion 112 of the machine frame 110 has horizontally extending guides 112*a*.

Figure 3:
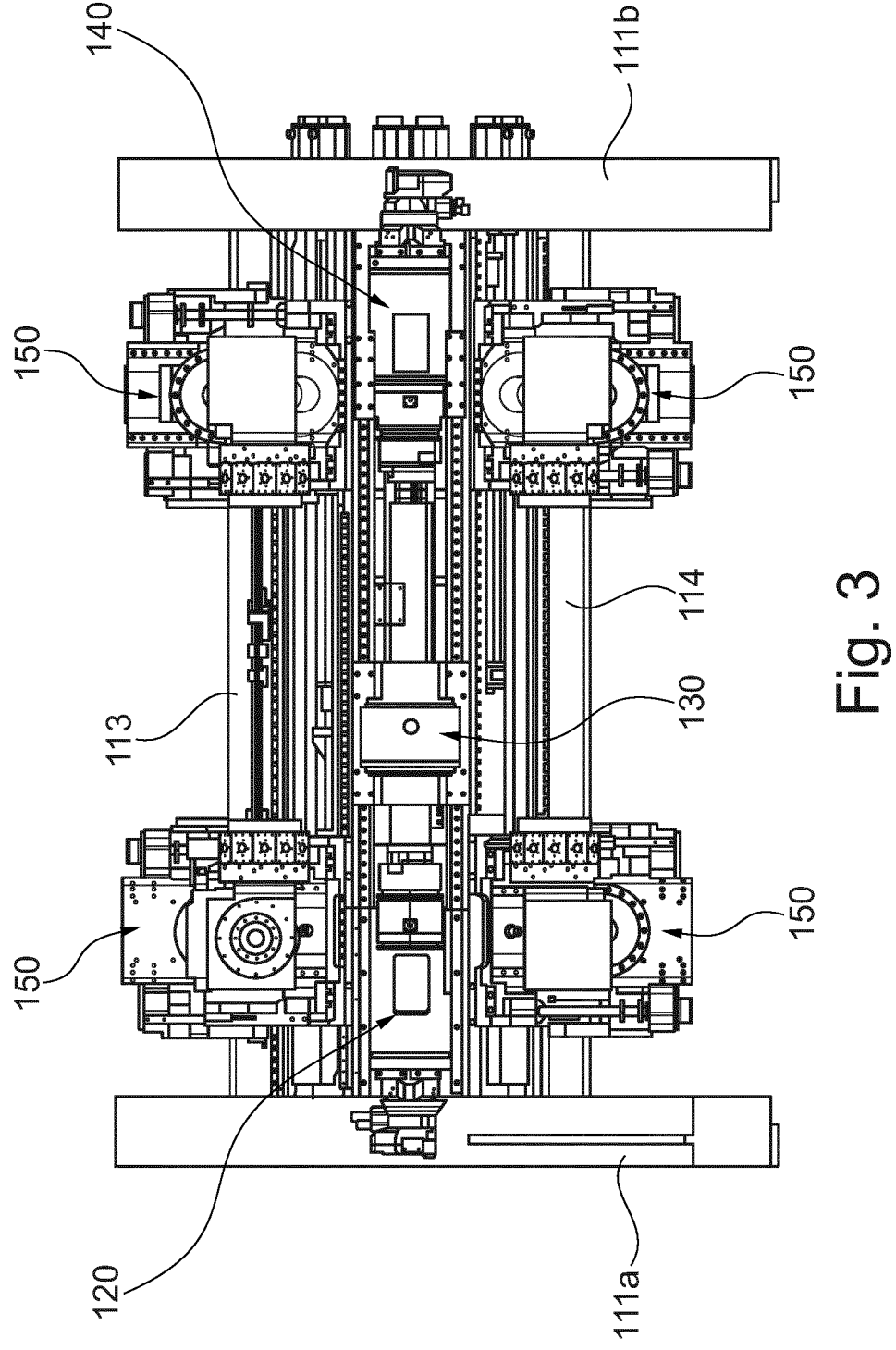

FIG. 3 is another view of the machine tool with the tool carrier assemblies 150. In the shown example, four separate tool carrier assemblies 150 are provided at four separate positions independently from each other. Preferably, the tool carriers provided for the tool carrier assemblies are identical and attached twisted by an angle of e.g. 90 or 180 degrees. The auxiliary spindle carrier 130 is provided between the main spindle carrier with the main spindle 121 and the counter spindle carrier 140 with the counter spindle 141. The tool carrier assemblies 150 are provided vertically above the horizontal axis HA on the upper support portion 113. On the lower support portion 114 the tool carrier assemblies 150 are provided below the horizontal axis HA are mounted.

Figure 4:
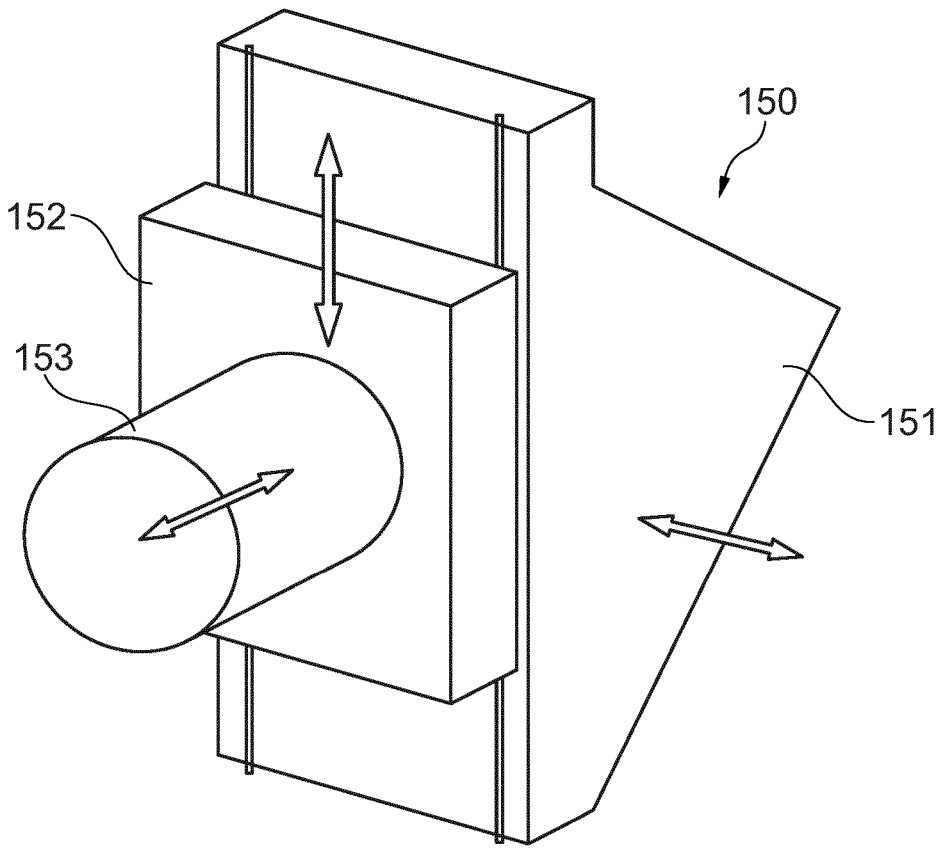

In FIG. 4 an example of a tool carrier assembly 150 is shown, attached to the carrier support slide 151. The respective carrier support slide 151 can be moved horizontally along the horizontal axis HA. The tool carrier support slide 152 allows movement in the vertical direction along the vertical axis VA. The turret or tool carrier quill 153 can be provided attached to the carrier support slide 152.

The tool carrier assembly 150 includes a carrier support slide 151 which is configured to be slidably mounted to the guides 113*a* or 114*a* of the upper and lower support portions 113 or 114 of the machine frame 110. Accordingly, when mounted on top of the upper support portion 113 on the guides 113*a*, the carrier support slide 151 is configured to be moved horizontally on and along the guides 113*a* in the horizontal direction in parallel to the horizontally and coaxially arranged spindle axes of the spindles 121 and 141. On the other hand when mounted in a hanging state at the overhanging lower support portion 114 at the guides 114*a*, the carrier support slide 151 is configured to be moved horizontally along the guides 114*a* in the horizontal direction in parallel to the horizontally and coaxially arranged spindle axes of the spindles 121 and 141.

On the front side of the carrier support slide 151 of the tool carrier assembly 150, facing the machining area of the machine tool 100 in between the spindles 121 and 141, a tool carrier support slide 152 is slidably mounted to the carrier support slide 151. The tool carrier support slide 152 is configured to be moved vertically on and along vertical guides arranged on a front face of the carrier support slide 151 in the vertical direction.

On the front side of the tool carrier support slide 152 of the tool carrier assembly 150, facing the machining area of the machine tool 100 in between the spindles 121 and 141, a horizontally arranged tool carrier quill exemplarily extending from the front side of the tool carrier support slide 152 vertically into the machining area of the machine tool 100 is exemplarily provided to mount a tool carrier at the front-side end portion of the tool carrier quill 153.

In exemplary embodiments, optionally, the tool carrier quill can be mounted to the tool carrier support slide 152 so as to controllably move horizontally in a direction perpendicular to the direction of the spindle axes of the spindles 121 and 141 towards the front of the machine tool 100.

By the above arrangement, the tool carrier assembly 150 is configured to carry a tool carrier or a turret unit T, e.g. a tool holder holding one or more tools, and is further configured to controllably move the tool carrier in three independent movement directions, including the direction extending vertically and perpendicular to the horizontally arranged direction of the spindle axes, a direction extending horizontally and perpendicular to the horizontally arranged direction of the spindle axes, and a Z-direction extending horizontally and in parallel with the horizontally arranged direction of the spindle axes. Accordingly, the tool carrier assembly 150 is exemplarily configured to be equipped with three independent controllable linear axes.

Furthermore, optionally, the tool carrier quill may be configured to further include a rotatably driven B-axis so as to control a rotational movement of the tool carrier mounted to the tool carrier assembly 150 around the horizontally arranged longitudinal axis of the tool carrier quill.

Figure 5:
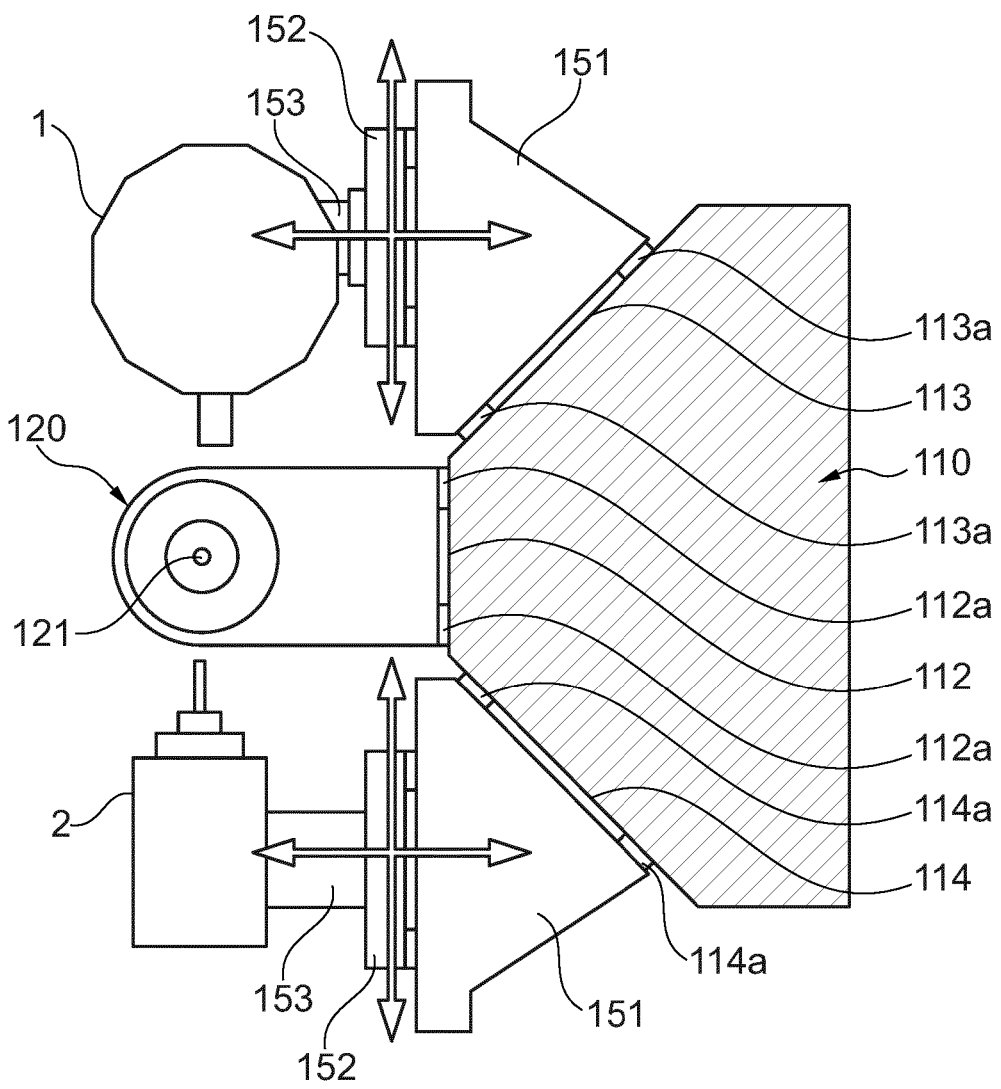
FIG. 5 exemplary illustrates a cross-sectional view through the machine frame.

FIG. 5 exemplarily shows a schematic a cross-sectional view through the machine frame 110 of the machine tool 100 of FIG. 2. The cross-sectional shape of the machine frame 110 of the machine tool 100 exemplarily includes an isosceles equiangular trapezoidal shape, which is rotated by 90 degrees. In other embodiments, the shape may be different and the rotation angle may be different.

FIG. 5 shows that the front support portion 112 of the machine frame 110 exemplarily has the vertically arranged front surface. The spindle carrier case 120 is mounted to the front-side of the machine tool 100 at the height of the front support portion 112. The front support portion 112 further supports the horizontally extending guides 112*a* on which the counter spindle carrier 140 and/or the auxiliary spindle carrier 130 can be slidably mounted (not shown in FIG. 5).

As previously mentioned, the upper side surface of the upper support portion 113 of the machine frame 110 is arranged at the inclined slope, exemplarily at an inclination angle of substantially 45 degrees (e.g. with respect to the work floor on which the machine frame 110 stands with its machine stand portions 111*a* and 111*b*). As previously mentioned, in other exemplary embodiments, the inclination angle of the upper side surface of the upper support portion 113 of the machine frame 110 may be in the range of 30 to 60 degrees.

For slidably supporting tool carrier assemblies 150 on the upper side of the machine frame 110 in a machining area between the spindles, the upper support portion 113 of the machine frame 110 has the horizontally extending guides 113*a* on which the upper tool carrier assembly 150 is mounted. The upper tool carrier assembly 150 can be moved horizontally and in parallel with the direction of the spindle axes (i.e. perpendicular to the drawing plane of FIG. 5).

The lower side surface of the lower support portion 114 of the machine frame 110 is arranged at the overhanging inclined slope, exemplarily at an inclination angle of substantially 315 degrees (e.g. with respect to the work floor on which the machine frame 110 stands with its machine stand portions 111*a* and 111*b*). Also, the inclination angle of the lower side surface of the lower support portion 114 of the machine frame 110 may be in the range of 300 to 330 degrees. Specifically, it may be preferably provided that the angle formed between the upper and lower support portions 113 and 114 is substantially 90 degrees.

For slidably holding tool carrier assemblies 150 at the lower side of the machine frame 110 in a machining area between the spindles in a hanging state, the lower support portion 114 of the machine frame 110 has the horizontally extending guides 114*a* on which the lower tool carrier assembly 150 is mounted in a hanging state. The lower tool carrier assembly 150 can be moved horizontally and in parallel with the direction of the spindle axes (i.e. perpendicular to the drawing plane of FIG. 5).

As can be seen in FIG. 5, an advantage of the lower side surface of the lower support portion 114 of the machine frame 110 being arranged at the overhanging inclined slope, to support and hold the lower tool carrier assembly 150 in the hanging state, is that the slides and support structures of the lower tool carrier assembly 150 can hide under the overhanging lower support portion 114 so as to not extend into the machining area under the spindles so that chip fall from workpieces during machining can fall down without being obstructed by the support structures of the lower tool carrier assembly 150.

Exemplarily, in FIG. 5, the upper tool carrier assembly 150 carries a tool turret 1 and the lower tool carrier assembly 150 carries a machining head 2 holding and driving a tool such as a grinding tool or a milling tool.

Figure 6B:
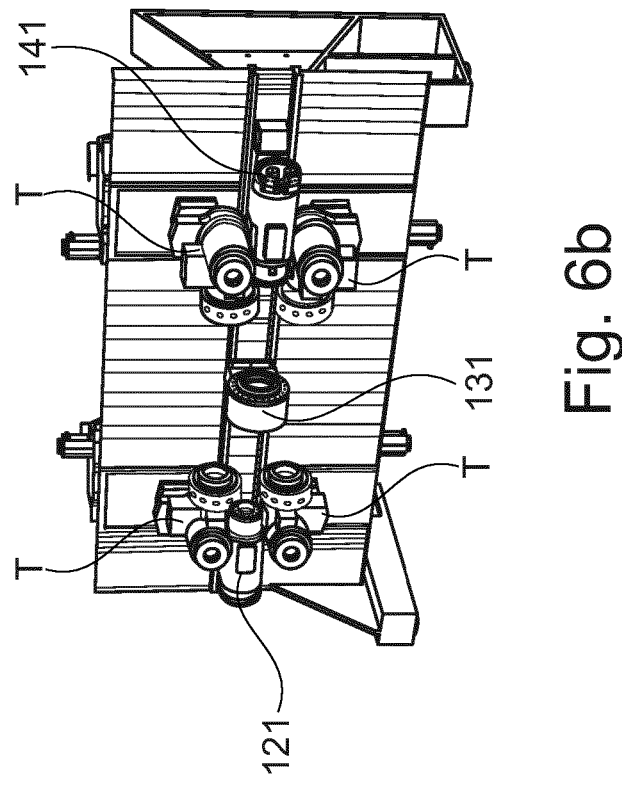
FIG. 6b exemplary illustrates a perspective view of the multi-spindle lathe including turret units and the auxiliary spindle.
Figure 6A:
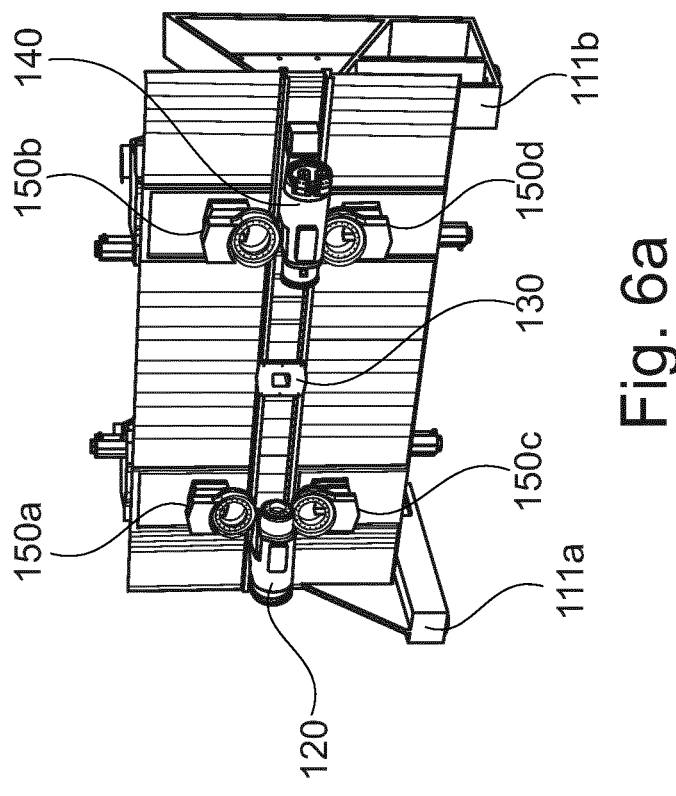
FIG. 6a exemplary illustrates a perspective view of the multi-spindle lathe.

FIGS. 6*a* and 6*b* show exemplary arrangements of the machine tool according to an embodiment of the invention. An upper left tool carrier assembly 150*a* and an upper right tool carrier assembly 150*b* are provided vertically above the horizontal axis HA. A main spindle carrier 120 with attachment sections for attaching a main spindle 121 is provided in the middle part of the front support portion of the machine tool. The auxiliary spindle carrier 130 is provided to be movable between the main spindle carrier 120 and the counter spindle carrier 140. Below the horizontal axis in the vertical direction, the lower left tool carrier assembly 150*c* is provided. Moreover, the lower right tool carrier assembly 150*d* is provided also below the horizontal axis HA. Each of the upper and lower tool carrier assemblies 150*a* to 150*d* is movable in the horizontal and vertical direction along the support plane as shown in FIG. 6*a* which is provided by the horizontal and vertical axis.

In FIG. 6*b*, respective turret units are exemplarily attached to the tool carrier assemblies. The turret units T are preferably provided with respective turret disks having a plurality of slots for mounting a plurality of tools for machining the workpieces. With a specific configuration as shown in FIG. 6, a very flexible and highly efficient machining system, specifically multi spindle lathe, can be provided for machining a plurality of workpieces at the same time using different tools.

Another advantage is the symmetric design of the turret units used for the lathe. Specifically, said turret units are designed with a symmetric main body such that for the four separate assembly positions on the tool carrier assembly 150*a* to 150*d*, the same type of turret unit T can be provided and, depending on the respective position of the turret unit, the turret head can be rotated accordingly. Accordingly, a very efficient and maintenance-friendly structure which at the same time allows flexible and cost efficient machining of workpieces can be achieved.

Figure 7:
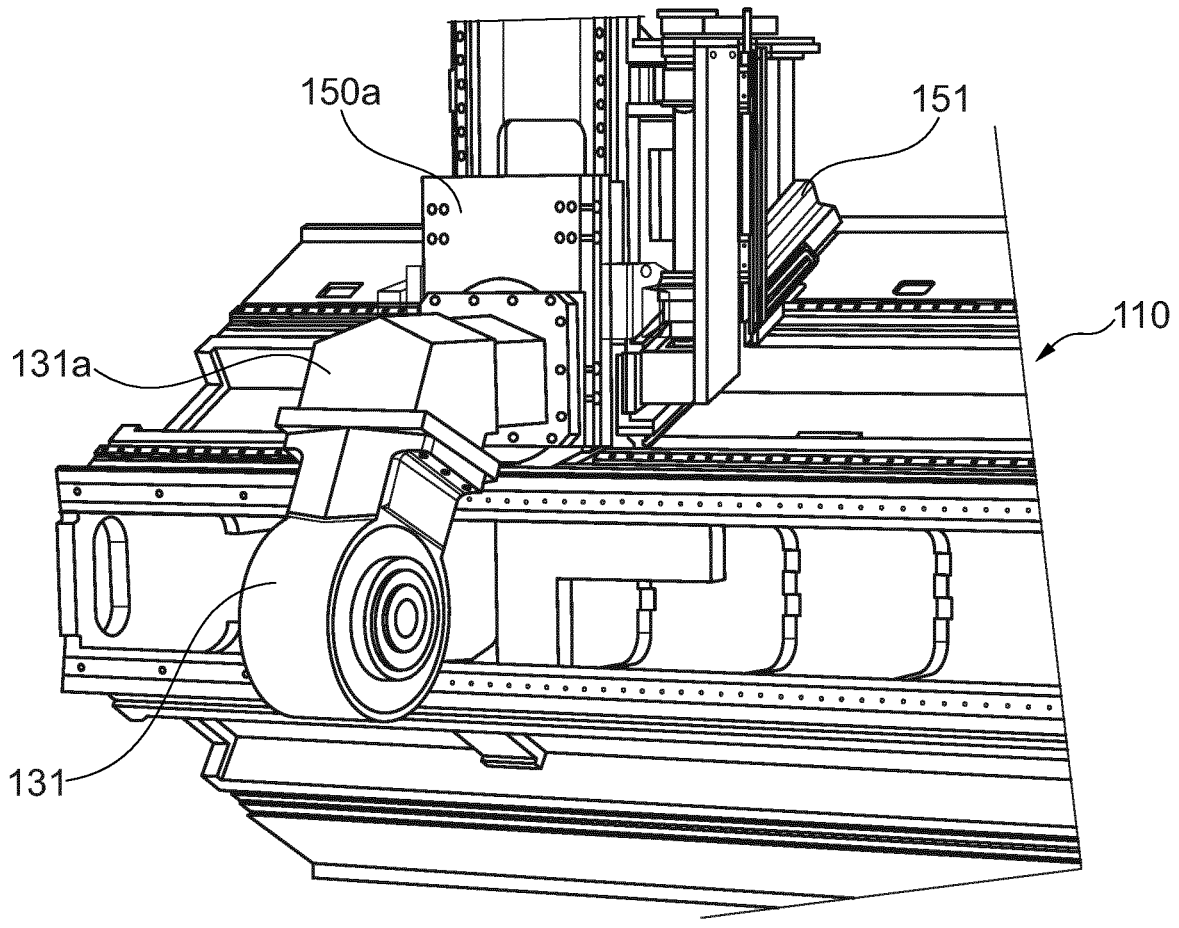
FIG. 7 exemplary illustrates an auxiliary spindle mounted to a tool carrier support slide.

A further embodiment is shown in e.g. FIG. 7 where the auxiliary spindle 131 is attached via an angled carrier unit 131 onto the upper left tool carrier assembly 150*a*. However, it is clear that also other positions of tool carrier assemblies 150 may be suitable for providing the auxiliary spindle 131 attached via the angled carrier 131*a*. By providing the specific arrangement, it is possible to provide the auxiliary spindle 131 which is movable in a vertical and horizontal direction. Moreover, also a plurality of auxiliary spindles 131 can be provided so that, for example, two separate auxiliary spindles 131 are provided respectively for the upper and/or lower tool carrier assemblies 150. Accordingly, the flexibility of machining the workpieces can be further increased and the tool carrier assembly 150 can be synergistically used for different operations, allowing improved serial production of complex workpieces.

Figure 8:
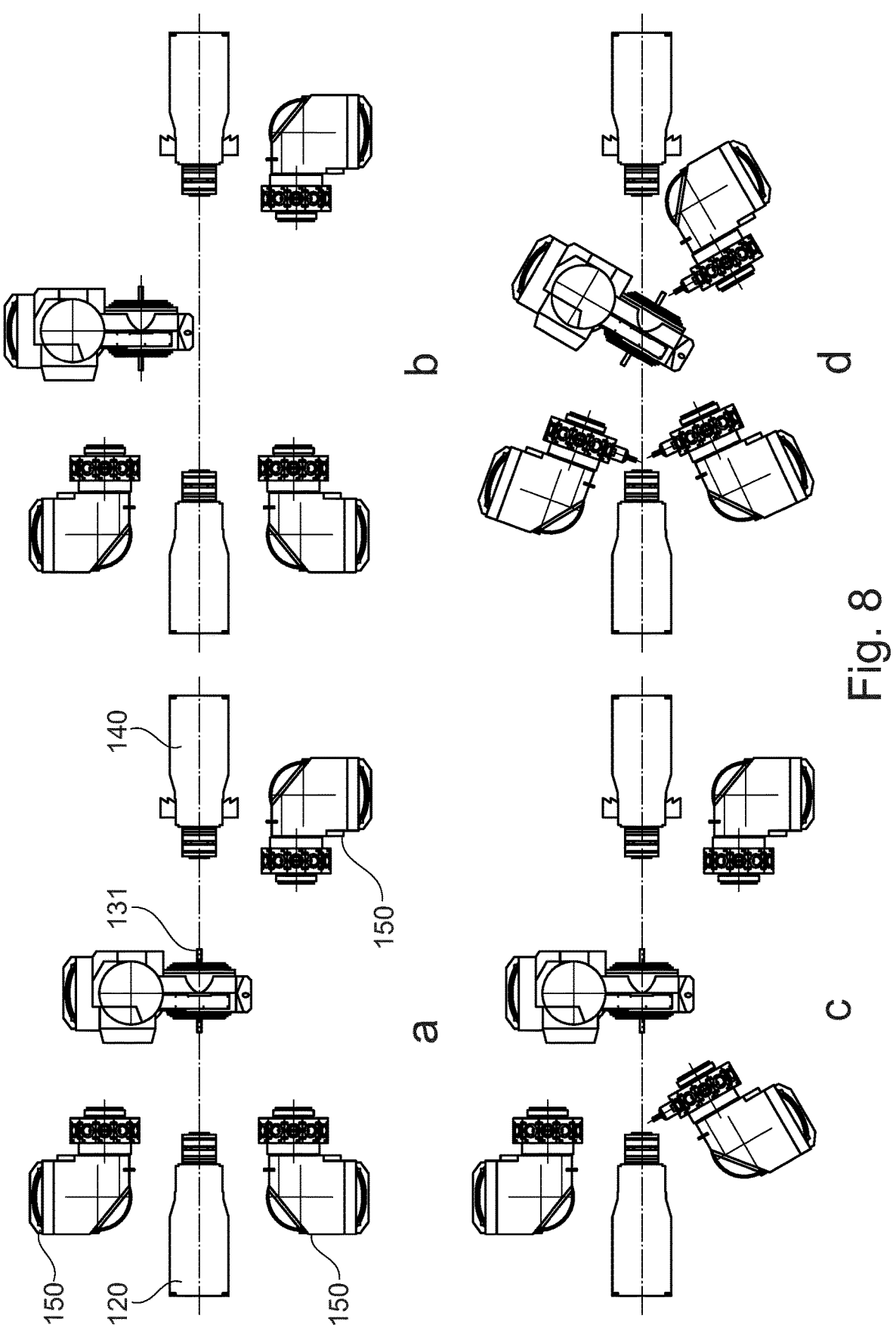
FIG. 8 exemplary illustrates turret units mountable independently to the machine tool and the movable auxiliary spindle.

FIGS. 8*a* to 8*d* shows an example of applying the auxiliary/additional spindle 131 to a machine tool and specifically to the tool carrier assembly of the machine tool. With the specific configuration as shown in FIG. 8*a*, a very flexible and highly efficient machining system, specifically multi spindle lathe, can be provided for machining a plurality of workpieces at the same time using different tools. The auxiliary spindle 131 may be provided to be movable between the main spindle carrier 120 and the counter spindle carrier 140 and additional in a vertical direction, as in FIG. 8*b*. Moreover the auxiliary spindle, having the auxiliary spindle axis XA, is provided on the auxiliary spindle carrier arranged on the tool carrier support portion to increase the flexibility. Below the horizontal axis in the vertical direction, the lower left tool carrier assembly 150 is provided. Moreover, the lower right tool carrier assembly 150 is provided also below the horizontal axis. Each of the upper and lower tool carrier assemblies are preferably movable in the horizontal and vertical direction. As clear from FIGS. 8*c* and 8*d*, one or more of the tool carrier and/or the auxiliary spindle may be configured to include a rotatably driven B-axis so as to control a rotational movement around the horizontally arranged longitudinal axis of the tool carrier and/or auxiliary spindle. By providing the additional spindle according to the present invention also machining of workpieces without any main or counter spindle becomes possible since machining only using the additional spindle is also possible. Highly efficient machining has been achieved by the combination of an auxiliary/additional spindle 131 having a B-axis movement in combination with at least one turret unit also having a B-axis movement. Therefore, both, the turret unit and the auxiliary spindle can be rotated (independently) around an axis perpendicular to the respective spindle axis. This combination allows to increase maximum angle between working pieces of the auxiliary spindle and tools on heads (e.g. turret unit). In a further development, all turret units have the B-axis movement.

Figure 9:
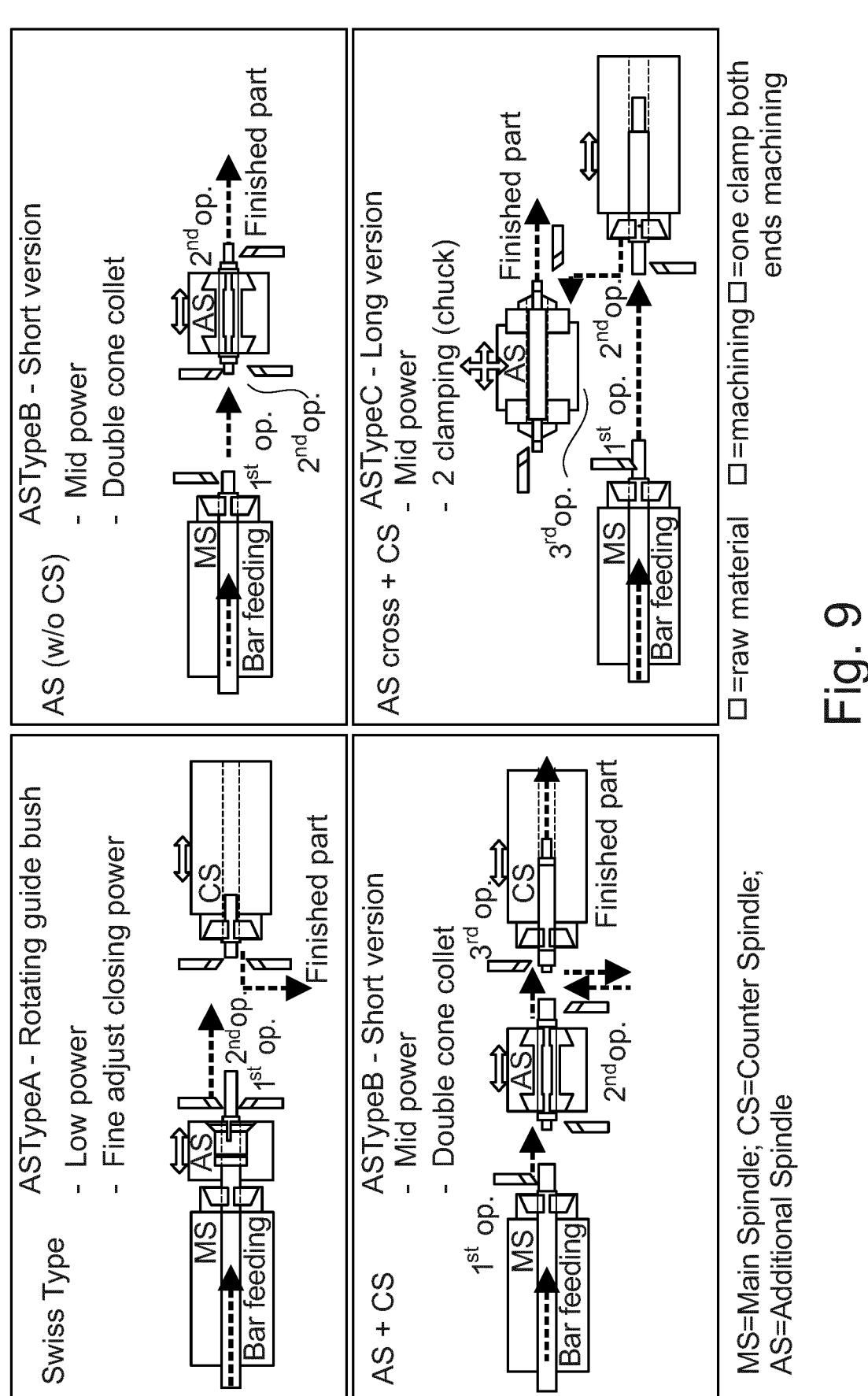
FIG. 9 exemplary illustrates an arrangement for bar machining.

In FIG. 9 an optimized machining process using the machine tool according to the present invention is shown. In the upper left illustration in the Figure, bar feeding machining is shown using the main spindle MS with the auxiliary spindle AS and the counter spindle CS. As shown, two separate tools are provided for machining the workpiece clamped in the auxiliary spindle AS (131) from one side. The raw material of the workpiece is fed via the main spindle MS. Accordingly, in a first operation step machining of the front end of the workpiece clamped in the auxiliary spindle AS is achieved. In order to machine the rear part of the workpiece, the auxiliary spindle AS moves the workpiece along the horizontal axis into the clamping unit of the counter spindle. As shown in FIG. 9, in the upper left illustration referred to as Swiss type, the workpiece can then be machined from the rear end while being clamped in the clamping part of the counter spindle. Accordingly, this may be regarded as the second operation step and therefore the second machining step for creating the respective workpiece. After machining the workpiece, said workpiece can be removed from the counter spindle when finished.

Moreover, as indicated in FIG. 9 in the upper right figure, referred to as AS (w/oCS), the additional spindle 131 is provided with a double cone collet for allowing machining on the front end and the rear end of the workpiece clamped in the auxiliary spindle, preferably synchronously. At the same time, machining of the next workpiece which is still in the main spindle is already possible. Accordingly, the respective configuration allows to process two separate workpieces at the same time, wherein one of these two workpieces can be processed on both sides thereof at the same time. After finishing machining in the second operation step, the finished part can be removed from the auxiliary spindle.

An even further development is provided in e.g. the left lower part of FIG. 9 referred to as AS+CS. Accordingly, the main spindle is provided together with the auxiliary spindle and the counter spindle. In a first operation step the workpiece fed by bar feeding via the main spindle along the central axis thereof can be processed on the front end. In the second operation step the auxiliary spindle can clamp the respective workpiece and allow processing of the front and rear end of the clamped workpieces, preferably at the same time. Accordingly, the front end of the workpiece and the rear end of the workpiece can be processed at the same time when a workpiece is clamped in the auxiliary unit. The auxiliary spindle can be moved along the horizontal axis such that a workpiece can be transported from the main spindle to the counter spindle. In the third operation step, the workpiece included in the counter spindle can be processed independently from the workpiece included in the auxiliary spindle or main spindle. The finished part can thereafter be provided through a central axis of the counter spindle out of the machining area of the machine tool. Accordingly, a very efficient and cost effective machining process can be achieved.

Moreover, in the lower right drawing in FIG. 9 which is also referred to as AS CROSS+CS, a highly flexible auxiliary spindle 131 is provided. Said auxiliary spindle is movable in the horizontal and vertical direction, accordingly, along the horizontal axis HA and the vertical axis VA orthogonal to the horizontal axis. The workpiece, fed through the central axis of the main spindle, can be processed in a first operation step on the front end as shown in the Figure of the lower right drawing. In the second operation step, the movable counter spindle which has picked up the workpiece from the main spindle allows processing of the rear end of the workpiece as shown in the Figure. Afterwards, the processed workpiece can be included and clamped into the auxiliary spindle so that, for example, the auxiliary spindle can move in the vertical and horizontal direction to receive the machined workpiece from the counter spindle and then for further machining the workpiece, the auxiliary spindle can then move away from the horizontal axis to allow movement of the counter spindle CS in the horizontal axis direction. Accordingly, synchronous machining of a workpiece in the main spindle MS, a counter spindle and in the auxiliary spindle is possible, as shown in the Figure. This is achieved mainly by providing the highly flexible movement of the auxiliary spindle 131, movable in the vertical and horizontal direction. The finished workpiece can be removed from the machining area by the auxiliary spindle in an appropriate manner. As a clamping unit two separate chucks are provided for the auxiliary spindle AS to fixedly clamp the respective workpiece.

Figure 10:
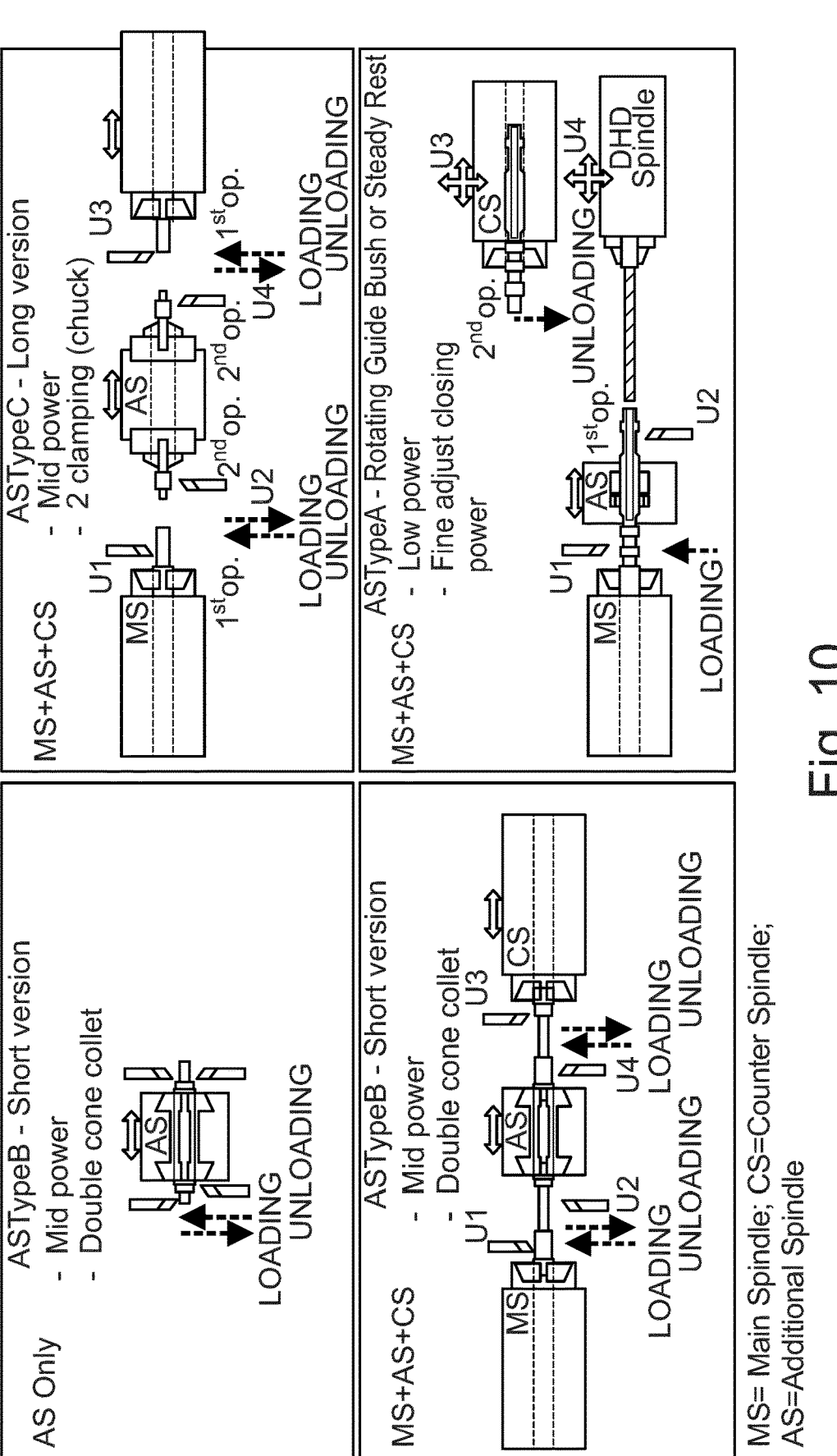
FIG. 10 exemplary illustrates arrangements for chuck machining.

A further specific example is shown in e.g. FIG. 10 which refers to the chuck machining using the auxiliary spindle AS as described above. As shown in the upper left Figure of FIG. 10 designated as AS only, processing the auxiliary spindle includes a workpiece which can be processed, preferably parallel, by four separate tools. The auxiliary spindle can be moved preferably at least in the horizontal direction, wherein by providing the double cone collet a fixed clamping of the workpiece can be easily provided so that highly accurate machining of the workpiece and facilitated loading and unloading becomes possible.

In a further configuration, as shown in the upper right part of FIG. 10 designated as Figure MS+AS+CS, the auxiliary spindle, which is movable in a horizontal direction, has two separate clamping units. Moreover, the main spindle and the counter spindle are provided, wherein the counter spindle is movable in the horizontal direction. In the respective Figure, four separate workpieces are processed at the same time. Specifically, the front end of the workpiece clamped in the main spindle can be processed U1. Moreover, the second workpiece clamped in the left clamping unit of the auxiliary spindle is processed in the second operation U2. At the same time, for the second operation also the front end of the third workpiece clamped in the right clamping unit of an auxiliary unit can be processed U4. Finally, also the fourth workpiece which is clamped in the counter spindle can be processed U3. Accordingly, by the specific arrangement a very high output of workpieces while at the same time a high accurate machining can be achieved. In the lower left part of FIG. 10 designated as Figure MS+AS+CS, the auxiliary spindle includes a double cone collet for further improved clamping operations.

In the lower right part of FIG. 10, designated as MS+AS+CS an additional rotating guide bush or a steady rest is provided for further increasing the machining flexibility of the multi spindle lathe.

Figure 11:
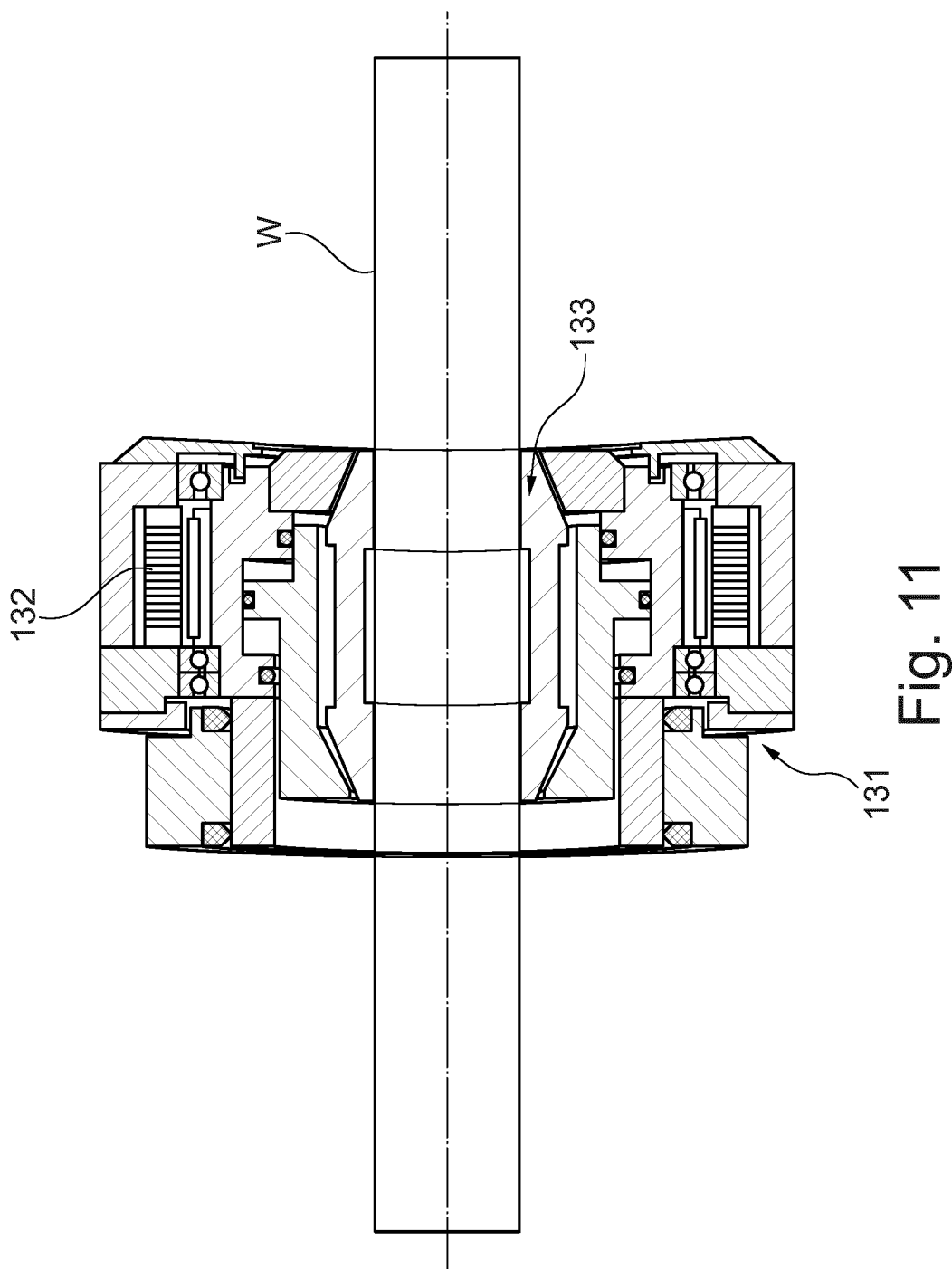
FIG. 11 exemplary illustrates a sectional view of an auxiliary spindle.

FIG. 11 exemplarily illustrates a sectional view of an auxiliary hollow spindle 131 according to exemplary embodiments. The auxiliary (hollow) spindle 131 includes the direct drive 132 arranged around the guide clamp unit including the sleeve 133 which can be electrically, hydraulically and/or pneumatically controlled to fixedly clamp the workpiece W coaxially with the spindle axes in the second clamping state, wherein both ends of the workpiece W extend out of the auxiliary hollow spindle 131 and are exposed for machining operations performed simultaneously on both side ends thereof. In addition to the above exemplary embodiments, further exemplary embodiments are conceivable.

For example, in other exemplary embodiments, the machine tool may further include the auxiliary spindle carrier being arranged on the upper or lower tool carrier portion of the machine frame, supporting the auxiliary hollow spindle being configured to receive and guide a workpiece coaxially with the spindle axis of the main spindle, in particular such that the workpiece extends out of the auxiliary hollow spindle on both sides of the auxiliary spindle carrier, in particular to enable machining of the workpiece clamped by the auxiliary hollow spindle without any release of the clamping state.

For example, the auxiliary spindle carrier can be configured to move along horizontal guides arranged on the upper or lower tool carrier portion of the machine frame in a horizontal direction in parallel with the spindle axis of the main spindle.

Also in such exemplary embodiments, the auxiliary spindle carrier can be arranged between the main spindle carrier and the counter spindle carrier. Also in such exemplary embodiments, the auxiliary spindle carrier can support a spindle slide supporting the auxiliary hollow spindle for driving a movement of the auxiliary hollow spindle transverse or perpendicular with respect to the spindle axes.

In further exemplary embodiments, the machine tool may include two auxiliary hollow spindles, e.g. one being arranged opposed the main spindle and one being arranged opposed the counter spindle, preferably both auxiliary hollow spindles being arranged between the main and counter spindles.

For example, both auxiliary hollow spindles can be configured to move horizontally in the direction of the spindle axes, and the two auxiliary hollow spindles may each be arranged as discussed above for the case of one auxiliary hollow spindle.

Specifically, the auxiliary spindle carriers may both be arranged on the spindle carrier portion. Also, each of the auxiliary spindle carriers may be arranged on the spindle carrier portion, the upper and/or the lower tool carrier portion. In some exemplary aspects, one auxiliary spindle carrier may be arranged on the upper tool carrier portion and the other auxiliary spindle carrier may be arranged on the lower tool carrier portion. Furthermore, one or both of the auxiliary hollow spindles can be configured to also move in a direction transverse or perpendicular to the spindle axes.

Figure 12:
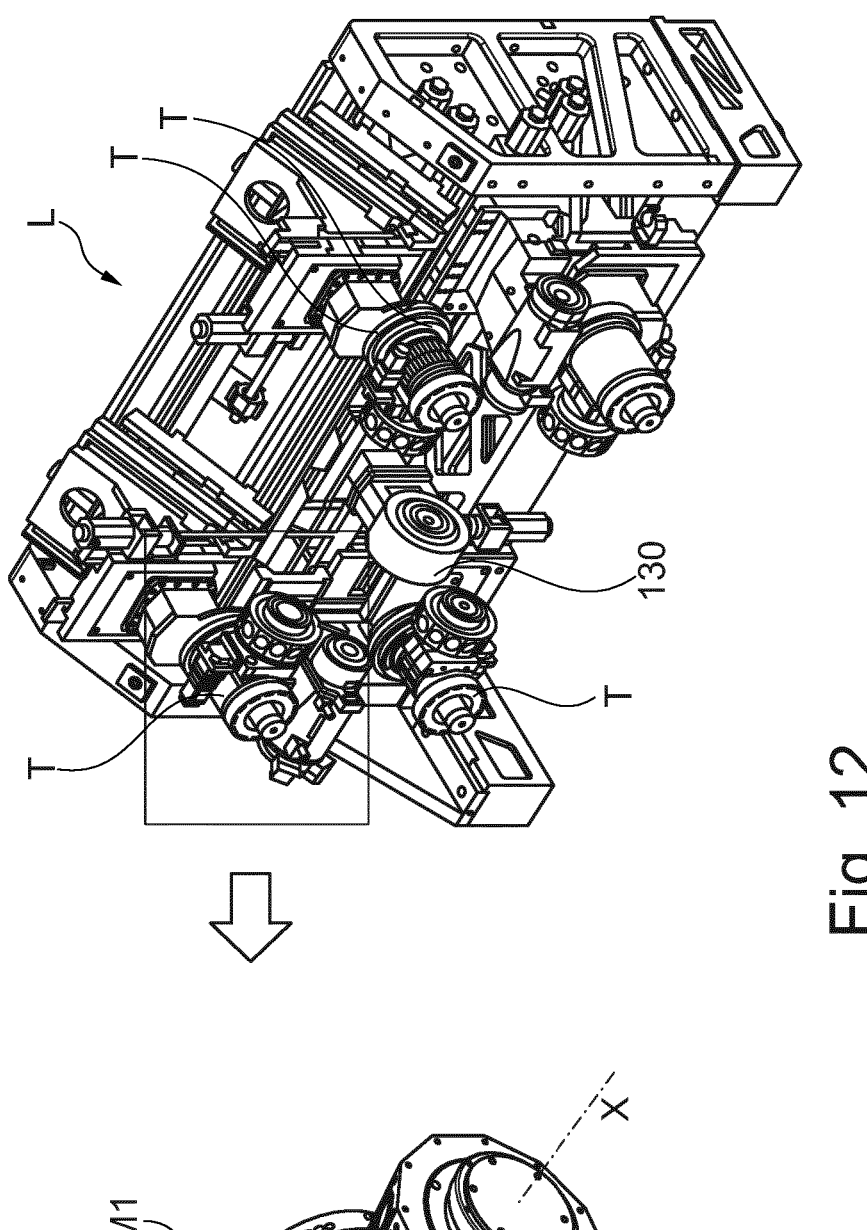
FIG. 12 exemplarily illustrates a schematic perspective view of a multi-spindle lathe having four similar turret units and details of the turret unit.
Figure 12:
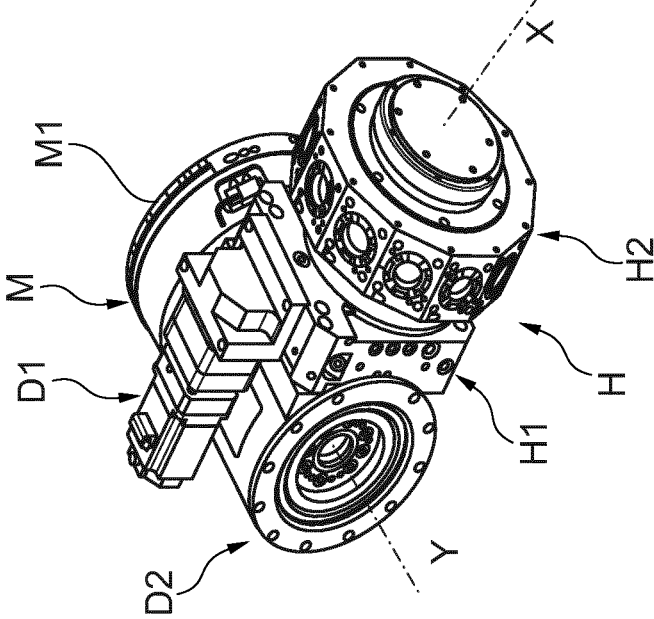

FIG. 12 exemplarily shows the configuration of a lathe L having four similar turret units T, each of them having the B axis movement function, thereby allowing the turret head H to rotate around the turret main body axis M.

As shown in the left side of FIG. 12, the turret unit T has a compact design due to the inverted motor configuration and the gearless torque transmission. The turret unit T includes the turret main body M which can be attached via the attachment section M1 of the turret main body to the tool carrier assembly 150. The attachment section M1 is arranged at the rear side of the turret main body M and the opposing side thereof, which may be referred to as the front side of the main body M is a free end of the turret main body M. While conventional turret units include a separated turret main body from a driving means for controlling the pivot of the turret head H around the B axis or Y axis, the present invention suggests an integrated driving means which is referred to as the second driving means D2. Said second driving means B2 is integrally formed in the turret main body M as a structural part thereof. As such, the outer cylindrical part of the turret main body M and the inner cylindrical part of the turret main body are respectively designed as the actual rotor and stator of the second driving means D2. As shown in FIG. 12 in the left side, the outer cylindrical part of the turret main body M is rotatable around the Y axis. This movement is commonly referred to as B axis movement.

In the example shown in FIG. 12, the Y axis which is the rotation axis of the turret main body (or turret rotation axis) extends orthogonally to the spindle axis of the main spindle. In order to change the turret head position, the B axis movement is integrated into the lathe such that the turret head H and the turret disk H2 can be rotated around the Y axis such that different tools or workpieces which are attached to the turret disk H2 can be flexibly arranged in relation to the main or auxiliary spindle allowing flexible and efficient machining of workpieces. The lathe according to the present invention is also superior to conventional lathes since the tool carrier assembly allows movement in vertical and horizontal direction of the turret unit T, wherein in combination with the turret unit T which allows a B axis movement very efficient processing of the workpieces can be achieved.

As clear from FIG. 12, the turret head H includes a base of the turret head H1 and a turret disk H2. The turret disk H2 has a rotation axis X. The turret disk H2 is configured to rotate around said turret disk rotating axis X. The revolving turret disk H2 has slots for machine tools and/or workpieces. Moreover, the turret disk H2 has an integrated third driving means D3 which allows to drive the tools attached or inserted into the slots of the turret disk H2. Preferably, the third driving means is a direct drive motor.

The arrangement of the turret disk H2 extends in a radial direction of the Y axis of the turret main body M. Accordingly, the turret disk H2 is arranged outside of the turret main body M in the radial direction. With regard to the axial direction of the Y axis of the turret main body M, the turret head H does not extend further than the free end of the turret main body M. The turret head H extends in the axial direction of the Y axis of the turret main body M, approximately to the end surface of the free end of the turret main body M. Accordingly, a very efficient and compact design can be achieved and the distance between the turret disk H2 and the attachment section M1 of the turret main body can be minimized. Inventors have realized such a specific design can significantly increase the mechanical stability and accuracy of the turret unit and the entire lathe L.

The turret head H has a flat turret design such that a base H1 of the turret head H is flat. Attached onto said base H1 the turret disk H2 is rotatably provided. The turret disk H2 is rotatable around the X axis. Preferably the X axis is approximately perpendicular to the Y axis of the turret main body M. For further flattening the turret head H, the additional driving means necessary for rotating the turret disk H2 is arranged as a first driving means D1 on top of the base H1 of the turret head and covering the part of the outer cylindrical shaft of the turret main body M. The first driving means D1 extends away from the turret disk H2 along the X axis. The base of the turret head H1 with the attached first driving means D1 form an L shape which is arranged to enclose the turret main body M to thereby achieve a vibration-resistant and compact turret unit T which can be flexibly attached to each of different tool carrier assembly positions of the lathe L or a machine tool. The radially outer circumferential surface of the turret main body M therefore is the mounting surface of the turret head H so that said turret head H can be attached radially spaced from the turret rotating axis Y In general, It is to be noted that workpieces can be loaded to the machine tool by a workpiece loading apparatus such as a bar loader, bar feeder, and/or a handling robot. Machined workpieces can be removed by an unloading apparatus, e.g. by a/the handling robot.

While certain exemplary aspects have been described above, it is to be understood that such aspects are merely illustrative of and are not restrictive on the broad invention, and that the exemplary aspects are not limited to the specific constructions and arrangements shown and described above, since various other changes, combinations, omissions, modifications and substitutions, in addition to those set forth in the above paragraphs, are possible. Those skilled in the art will appreciate that various adaptations, modifications, and/or combination of the just described aspects can be configured. Therefore, it is to be understood that, further aspects may be practiced other than as specifically described herein. Those skilled in the art will also appreciate, in view of this disclosure, that different aspects described herein may be combined to form other aspects of the present disclosure.

Moreover the following aspects according to the invention are described:

According to an aspect for the machine tool the lower side-surface of the lower tool carrier support portion is inclined at an overhanging inclination angle in the range between 300 and 330 degrees, in particular at substantially 315 degrees.

According to an aspect for the machine tool an upper side-surface of the upper tool carrier support portion, to which the one or more tool carriers are mountable, is arranged to have an inclination.

According to an aspect for the machine tool the upper side-surface of the upper tool carrier support portion is inclined at an inclination angle in the range between 30 and 60 degrees, in particular at substantially 45 degrees.

According to an aspect for the machine tool one or more or each tool carrier assembly is configured to independently move the respective tool carrier in one or more linear directions, including at least one of a Z-axis movement direction for moving the tool carrier horizontally in a direction in parallel to the spindle axis of the main spindle, an X-axis movement direction for moving the tool carrier radially with respect to the spindle axis of the main spindle, and a Y-axis movement direction for moving the tool carrier in a direction perpendicular to the spindle axis of the main spindle and perpendicular to the X-axis movement of the main spindle.

According to an aspect for the machine tool one or more or each tool carrier assembly is configured to rotate the respective tool carrier about a rotation axis which extends perpendicular to the spindle axis of the main spindle, in particular by a B-axis movement.

According to an aspect for the machine tool the main spindle carrier and/or the counter-spindle carrier is configured to move along horizontal guides arranged on the spindle carrier portion of the machine frame in a horizontal direction in parallel with the spindle axes of the main and counter spindles.

According to an aspect for the machine tool the counter-spindle carrier supports a is spindle slide supporting the counter spindle for driving a movement of the counter spindle transverse or perpendicular with respect to the spindle axes.

According to an aspect for the machine tool the auxiliary spindle carrier is configured to move along horizontal guides arranged on the spindle carrier portion of the machine frame in a horizontal direction in parallel with the spindle axis of the main spindle.

According to an aspect for the machine tool the auxiliary spindle carrier is arranged between the main spindle carrier and the counter spindle carrier.

According to an aspect for the machine tool the auxiliary hollow spindle includes an electrically, hydraulically and/or pneumatically controlled clamp unit to clamp the workpiece received in the auxiliary hollow spindle, and a drive to drive a rotational motion of the workpiece clamped by the clamp unit.

According to an aspect for the machine tool the drive includes an electric or electro-magnetic direct drive mechanism.

According to an aspect for the machine tool the auxiliary spindle carrier supports a spindle slide supporting the auxiliary hollow spindle for driving a movement of the auxiliary hollow spindle transverse or perpendicular with respect to the spindle axes.

By exemplary embodiments and aspects as described above, there are proposed beneficial further aspects and features to enhance the machining options of the turret unit and machine tool, specifically lathe, to provide a cost effective machine concept, allowing for more flexible, accurate, efficient and reliable machining operations, and/or to improve accuracy and/or stability of the machine tool.

While certain exemplary embodiments and/or aspects have been described and shown in the accompanying drawings, it is to be understood that such embodiments and aspects are merely illustrative of and are not restrictive on the broad invention, and that the embodiments of invention are not limited to the specific constructions and arrangements shown and described, since various other changes, combinations, omissions, modifications and substitutions, in addition to those set forth in the above sections, are possible.

Those skilled in the art will appreciate that various adaptations, modifications, and/or combination of the just described embodiments can be configured without departing from the scope of disclosure of the present invention. Those skilled in the art will also appreciate, in view of this disclosure, that different embodiments of the invention described herein may be combined to form other embodiments of the invention. Therefore, it is to be understood that, the invention may be practiced other than as specifically described herein.

The invention claimed is:

1. Machine tool, in particular a lathe, comprising:
a machine frame having tool carrier support portions and a spindle carrier portion for carrying a spindle, and
at least a tool carrier, being supported on a tool carrier assembly being arranged on a tool carrier support portion of the machine frame,
wherein the machine tool further includes an auxiliary spindle carrier supporting an auxiliary spindle, having an auxiliary spindle axis, wherein the auxiliary spindle carrier is arranged on the spindle carrier portion of the machine frame or on the tool carrier support portion,
wherein the auxiliary spindle is configured to clamp a workpiece such that the workpiece can be exposed from two opposing sides of the auxiliary spindle for performing machining operations on both side ends of the workpiece,

wherein the auxiliary spindle is configured to be rotated around an axis extending perpendicular to the auxiliary spindle axis, and wherein the auxiliary spindle is configured to be movable along a vertical and a horizontal axis.

2. The machining tool according to claim 1, wherein the auxiliary spindle is a hollow spindle having at least two sides, each side configured to receive the workpiece, wherein the sides are spaced apart from each other preferably along the auxiliary spindle axis.

3. The machine tool according to claim 1, wherein the auxiliary spindle includes at least one direct drive arranged around a guide clamp unit of the auxiliary spindle.

4. The machine tool according to claim 1, wherein the machine tool is configured to parallel machine two workpieces clamped into the auxiliary spindle.

5. The machine tool according to claim 1, further comprising a spindle carrier, being arranged on or at a height of the spindle carrier portion of the machine frame, supporting a main spindle configured to receive a workpiece, the main spindle having a horizontally arranged main spindle axis and/or wherein the auxiliary spindle carrier is configured to move the auxiliary spindle along a main spindle axis and preferably also orthogonal to the main spindle axis.

6. The machine tool according to claim 1, wherein the auxiliary spindle includes one or more sleeves which can be independently controlled to electrically, hydraulically and/or pneumatically clamp the workpiece coaxially with the auxiliary spindle axis.

7. The machine tool according to claim 1, including a counter-spindle carrier being arranged on the spindle carrier portion of the machine frame, supporting a counter spindle facing a main spindle and being configured to receive a workpiece, the counter spindle having a horizontally arranged spindle axis being arranged coaxially with the main spindle axis.

8. The machine tool according to claim 1, including at least an upper tool carrier assembly mounted on an upper tool carrier support portion and at least a lower tool carrier assembly mounted on a lower tool carrier support portion wherein the tool assemblies are configured to independently machine one or more workpieces accommodated in the auxiliary spindle.

9. The machine tool according to claim 1, wherein the auxiliary spindle includes one or more chucks having jaws that move independently, to hold irregularly shaped workpieces and preferably the auxiliary spindle includes two or more separate and independent chucks spaced apart along the auxiliary spindle axis and/or the auxiliary spindle includes a double cone collet for clamping the workpiece.

10. The machine tool according to claim 1, wherein the auxiliary spindle is mounted to a tool carrier of an upper tool carrier support portion or a lower tool carrier support portion of the machine frame.

11. The machine tool according to claim 1, including two upper tool carrier assemblies mounted on an upper tool carrier support portion and two lower tool carrier assemblies mounted on a lower tool carrier support portion wherein each tool carrier assembly includes a tool carrier and the tool carriers are configured to independently machine workpieces accommodated in the auxiliary spindle and/or a main spindle, and preferably the tool carriers machine the workpiece synchronous.

12. The machine tool according to claim 1, wherein the auxiliary spindle is configured as a turret unit having a turret disk configured to be rotatable, by a first driving means, around a disk axis which is an axis of rotation of the turret disk, and a second driving means for pivoting a turret head around a turret axis and wherein preferably the second driving means is a motor having a rotor arranged radially outside of a stator.

* * * * *